(12) United States Patent
Nemoto et al.

(10) Patent No.: US 6,858,342 B2
(45) Date of Patent: Feb. 22, 2005

(54) ELECTROLYTE SOLUTION FILLING METHOD AND BATTERY STRUCTURE OF LITHIUM SECONDARY BATTERY

(75) Inventors: Hiroshi Nemoto, Nagoya (JP); Kenshin Kitoh, Nagoya (JP); Akio Enomoto, Chita-gun (JP)

(73) Assignee: NGK Insulators, Ltd., Nagoya (JP)

( * ) Notice: Subject to any disclaimer, the term of this patent is extended or adjusted under 35 U.S.C. 154(b) by 211 days.

(21) Appl. No.: 10/106,748

(22) Filed: Mar. 26, 2002

(65) Prior Publication Data

US 2002/0106554 A1 Aug. 8, 2002

Related U.S. Application Data

(62) Division of application No. 09/415,164, filed on Oct. 8, 1999.

(30) Foreign Application Priority Data

| Oct. 13, 1998 | (JP) | ............................................. 10-290832 |
| Nov. 4, 1998 | (JP) | ............................................. 10-313266 |
| Nov. 25, 1998 | (JP) | ............................................. 10-334291 |

(51) Int. Cl.[7] .......................... H01M 2/36; H01M 2/38; H01M 2/02; H01M 2/08
(52) U.S. Cl. ........................ 429/72; 429/81; 429/170; 429/171; 429/185
(58) Field of Search .................. 429/94, 170, 171, 429/181, 72, 80, 81, 185

(56) References Cited

U.S. PATENT DOCUMENTS

| 4,663,247 A | | 5/1987 | Smilanich et al. |
| 4,767,682 A | | 8/1988 | Dorogi et al. |
| 5,015,542 A | * | 5/1991 | Chaney et al. ............... 429/56 |
| 5,017,442 A | * | 5/1991 | Watanabe et al. ............ 429/94 |
| 5,458,993 A | * | 10/1995 | Terao et al. ................... 429/94 |
| 5,525,437 A | | 6/1996 | Freluche et al. |
| 5,527,644 A | * | 6/1996 | Kita et al. .................... 429/247 |
| 5,571,632 A | * | 11/1996 | Teramoto ...................... 429/94 |
| 5,896,647 A | | 4/1999 | Shkuratoff |
| 6,071,638 A | | 6/2000 | Fradin |
| 6,344,292 B1 | | 2/2002 | Nemoto et al. |

FOREIGN PATENT DOCUMENTS

| DE | 895 011 C | * | 10/1953 |
| DE | 0 660 431 A1 | * | 6/1995 |
| EP | 0 660 431 A1 | * | 6/1995 |

(List continued on next page.)

OTHER PUBLICATIONS

Patent Abstracts of Japan, vol. 006, No. 067 (E–104), Apr. 28, 1982 & JP 57 009074 A (Matsushita Electric Ind. Co. Ltd.), Jan. 18, 1982.*

Patent Abstracts of Japan, vol. 007, No. 107 (E–174), May 11, 1983 & JP 58 030073 A (Matsushita Electric Ind. Co. Ltd.), Feb. 22, 1983.*

(List continued on next page.)

*Primary Examiner*—Patrick Ryan
*Assistant Examiner*—Julian Mercado
(74) *Attorney, Agent, or Firm*—Burr & Brown

(57) ABSTRACT

Provided are a method for filling an electrolyte solution and a battery structure of a lithium secondary battery comprising an internal electrode body formed by winding a positive electrode, and a negative electrode, with a separator sandwiched therebetween around the outer periphery of a core, and an electrolyte solution to impregnate said internal electrode body; said method being excellent in productivity, and battery performance as well, and being characterized by an easy filling of an electrode solution, with minimization of excessive electrode solution in the battery, by virtue of the provision of an electrolyte solution injection opening in a specific position, through which the electrolyte solution is injected and extracting efficiently by using a nozzle for injection and/or extraction of electrolyte solution.

11 Claims, 8 Drawing Sheets

FOREIGN PATENT DOCUMENTS

| | | | |
|---|---|---|---|
| EP | 0 771 040 A2 | * | 5/1997 |
| EP | 0 822 605 A2 | * | 2/1998 |
| EP | 0 913 874 A1 | * | 5/1999 |
| JP | 57-9074 | | 1/1982 |
| JP | 57-009074 | | 1/1982 |
| JP | 58-030072 | | 2/1983 |
| JP | 58-030073 | | 2/1983 |
| JP | 62-264563 | | 11/1987 |
| JP | 1-175176 | * | 7/1989 |
| JP | 06-333599 | * | 12/1994 |
| JP | 07-014609 | * | 1/1995 |
| JP | 08-250084 | * | 9/1996 |
| JP | 9-92241 | * | 4/1997 |
| JP | 9-92338 | * | 4/1997 |
| JP | 09-092238 | | 4/1997 |
| JP | 09-092250 | | 4/1997 |
| JP | 09-092335 | | 4/1997 |
| JP | 10-050347 | | 2/1998 |
| JP | 10-083805 | | 3/1998 |
| JP | 10-125347 | * | 5/1998 |
| JP | 10-144339 | * | 5/1998 |
| JP | 10-233233 | | 9/1998 |
| JP | 10-270048 | | 10/1998 |
| JP | 11-111259 | | 4/1999 |
| JP | 11-195425 | | 7/1999 |
| JP | 11-339758 | | 12/1999 |
| JP | 2000-082486 | | 3/2000 |

OTHER PUBLICATIONS

Patent Abstracts of Japan, vol. 007, No. 107 (E–174, May 1983 & JP 58 030072 A (Matsushita Denki Sangyo KK), Feb. 22, 1983.*

Patent Abstracts of Japan, vol. 006, No. 136 (E–120), Jul. 23, 1982 & JP 57 060674 A (Shin Kobe Electric Mach Co. Ltd.), Apr. 12, 1982.*

Patent Abstracts of Japan, vol. 006, No. 077 (E–106), May 14, 1982 & JP 015368 A (Shin Kobe Electric Mach Co. Ltd.), Jan. 26, 1982.*

Patent Abstracts of Japan, vol. 012, No. 150 (E–606), May 10, 1988 & JP 62 264563 (Xuasa Battery Co. Ltd.), Nov. 17, 1987.*

U.S. Appl. No. 09/819,329, filed Mar. 28, 2001, Enomoto et al.

U.S. Appl. No. 09/870,372, filed May 30, 2001, Nemoto et al.

* cited by examiner

ELECTROLYTE SOLUTION

ELECTROLYTE SOLUTION FILLING METHOD AND BATTERY STRUCTURE OF LITHIUM SECONDARY BATTERY

CROSS REFERENCE TO RELATED APPLICATION

This application is a divisional application of U.S. application Ser. No. 09/415,164 filed Oct. 8, 1999, now allowed, the entirety of which is incorporated herein by reference.

BACKGROUND OF THE INVENTION AND RELATED ART STATEMENT

This invention relates to a method for filling an electrolyte solution into a lithium secondary battery; said method capable of filling electrolyte solution into a case and extracting an excessive electrolyte solution therefrom, and sealing easily a battery, thereby the simplification of fabrication process, the reduction in the production cost, and the improvement in compaction of energy density can be achieved, and a battery structure of the lithium secondary battery; said battery having a reduced current collection resistance from positive electrodes and negative electrodes, and a narrowed deviation in the fluctuation in the resistances among the tabs engaged in current collection as well, and having a simple structure as a battery so as to enable easier assembly of the battery and to effectuate the aforementioned method for filling an electrolyte solution into the case easily.

In recent years, the lithium secondary battery has been widely used as a power battery for handy electronic appliances such as personal handy phone systems, video tape recorders, notebook-type computers, or the like. Additionally, in the case of a lithium secondary battery, a single battery can generate a voltage of approximately 4 V, and this level of voltage is higher than that of conventional secondary batteries such as a lead battery, or the like, and its energy density is also high. Thus, much attention has been paid to it not only as a power source for the aforementioned handy electronic appliances, but also as a motor driving power source for an electric vehicle (EV) or a hybrid electric vehicle (HEV), of which penetration among the general public is being earnestly planned as a low-pollution vehicle due to the recent development in the environmental problems.

In a lithium secondary battery, in general, a lithium-transition metal compound oxide as a positive active material, a carbon material as a negative active material, and an organic electrolyte solution obtained by dissolving a Li-ion forming electrolyte in an organic solvent as an electrolyte solution are used. And, for an internal electrode body as a portion where battery reaction is carried out, various types are available.

For example, in a coin-shaped battery with a small capacity, a sandwiched-type internal electrode body in which a separator is sandwiched between a positive electrode and a negative electrode is used. Here, as the positive electrode and the negative electrode, those that are formed in a disk like shape, or in a coin like shape by subjecting positive material and negative material to press-forming processing or the like, respectively are suitably used.

As one example of preferable structures of internal electrode bodies to be used for a lithium secondary battery with a comparatively large capacity usable for an EV, or the like, as is shown in FIG. 18, there is given a wound-type internal electrode body 1 being formed by winding around the outer periphery of a hollow cylinder-shaped core 6 a positive electrode 2 having one or more tabs 5 for current collection and a negative electrode 3 having one or more tabs 5 for current collection, in such a manner that the positive electrode 2 and negative electrode 3 are not brought into direct contact with each other, by sandwiching a separator 4 between the positive electrode 2 and the negative electrode 3. Here, in general, the length of the core 6 is set equal to the width of the positive electrode 2 and that of the negative electrode 3. Incidentally, there is also proposed a battery using a laminate-type internal electrode body formed by laminating alternately via separators 4 a plurality of positive electrodes 2 and negative electrodes 3 having been prepared by cutting the above-mentioned positive and negative electrodes, respectively into those with small areas.

Now, in any case where any of the above-described structures is adopted as an internal electrode body, it is necessary to soak the internal electrode body in an electrolyte solution. Here, as an electrolyte solution, a non-aqueous electrolyte solution (hereinafter to be referred to as an "electrolyte solution"), which is obtained by dissolving a lithium electrolyte in an organic solvent, is used. In the case of a coin-shaped battery, for example, there is employed such a technique that a predetermined quantity of an electrolyte solution is injected by using a metering pump, or the like, under a reduced atmosphere and the battery case is sealed so as to fill the case with the electrolyte solution, after the internal electrode body is mounted inside a battery case. In addition, even in the case where a wound-type internal electrode body is used, a similar technique is used as long as a small capacity battery such as a common 18650 (with a diameter of 18 mm$\phi$ and a length of 65 mm) cylinder-type battery is produced. In such a method, an excessive amount of electrolyte solution that is not actually required is liable to be filled therein.

Since electrolyte solution is generally expensive, the percentage of battery costs attributable to electrolyte solution is not small. Nevertheless, in the case of those batteries having a small capacity, the reasons why the aforementioned method for filling an electrolyte solution is adopted are considered that:

the space where excessive electrolyte solution (hereinafter to be referred to as a "excessive electrolyte solution") is filled in is small in the absolute value, the cost for the electrolyte solution used for filling such a small space is considered not to be so high since the internal electrode body does not occupy much space in the interior of the battery in a small capacity battery;

a desired battery performance is obtainable if a minimum required quantity of an electrolyte solution is filled in a case since the area of reaction in the battery is small; and an introduction of a step for recovering excessive electrolyte solution results in raising production costs unintentionally, etc.

On the contrary, in the case of a battery having a relatively large capacity (hereinafter to be referred to as a "large capacity battery") to be applied to an EV, or the like, the size of a battery itself will necessarily become large. In such a case, the use of the wound-type internal electrode body 1 shown in FIG. 18 requires a larger space for housing the current collection tabs 5 at both ends or one end of the case for the battery. Additionally, since a hollow cylinder-shaped type core is generally used for the core 6, the absolute volume to be occupied by these spaces inside the case for the battery becomes large.

Accordingly, if an electrolyte solution is filled into a case for a large capacity battery by using a technique similar to that for the above-described small capacity battery, an expensive electrolyte solution is used not in an economic manner. This would bring about an increase in the production cost and a reduction in the energy density of the battery, as well. Furthermore, it is not preferable, from the viewpoint of durability, for metal members other than the internal electrode body, sealing members of the battery case, and the like, to be always in contact with the electrolyte solution since it causes often the leakage of the electrolyte solution, the corrosion of said members, or the like.

On the other hand, the electrolyte solution is required to fill in an amount sufficient to impregnate the internal electrode body properly even in the case of a large internal electrode body having a large battery area. And in the case where this is not fulfilled, not only the desired battery performance cannot be attained, but also the fluctuation in the performance of respective batteries will take place. Accordingly, in the case of a large capacity battery, it is preferable to impregnate the internal electrode body thoroughly in an excessive amount of an electrolyte solution under a reduced atmosphere, and thereafter the excessive electrolyte solution is removed.

Therefore, in a large capacity battery, if one wants to fill an electrolyte solution by employing a technique similar to that for a small capacity battery, the following steps would be given as an example:

as shown in FIG. 17, at first, a case for battery 65 with one end portion 61 having been sealed is disposed in a globe box or the like with the sealed end 61 being placed downward, then an electrolyte solution transferred from another end portion 62 of the case which is open at the upper portion with a metering pump or the like is injected by using a nozzle 63 or the like after reducing the atmosphere of the globe box in such a manner that the electrolyte solution is injected intermittently until the liquid surface does not go down so as to subject the internal electrode body to the impregnation treatment with the electrolyte solution for a predetermined period of time, the interior of the globe box or the like is purged with inert gas, thereafter the excessive electrolyte solution is drained by putting the case for battery 65 upside down, and finally the end portion 62 which has been left open is sealed.

However, in the case of such a method that an electrolyte solution is supplied from the upper portion of the case for the battery, the impregnation of an electrolyte solution starts mainly from the upper portion of the internal electrode body under a reduced atmosphere. Therefore, bubbles generated in the lower portion of the internal electrode body will hardly be liberated form the upper portion of the case for the battery. Accordingly, it will require holding the resultant for a long period of time under reduced atmosphere. In this case, if an organic solvent being highly volatile is solely used for an electrolyte solution, the evaporation of the solvent will bring about a problem in that the density of electrolyte fluctuates from product to product. In addition, in the case where a highly volatile organic solvent is mixed with one or more other non-volatile solvent or the like for use, the predominant evaporation of the volatile organic solvent causes the deviation in mixing ratio from product to product. This would bring about a problem in that the density of the electrolyte fluctuates from product to product. Anyhow, in any one of these cases, the full extent of exertion of the performance of electrolyte solution cannot be expected.

Moreover, in the case of a large capacity battery, due to a big shape of the battery itself, the sealing of an open end of the case for the battery within the globe box or the like would bring about various problems. That is, an enlargement of the globe box or the like is required since a sealing device should be installed within the globe box or the like. Furthermore, the enlargement of the globe box results in the decrease in the degree of the reduction of the interior pressure thereof, the enlargement of the vacuum pump, and the mass consumption of purge gas or the like. Thus, it is not realistic.

Therefore, the present inventors have extensively studied, in particular, the simplification of a method for filling an electrolyte solution in the production of a large capacity battery. As a result, they reached the present invention to be described later. Moreover, various studies have been made at the same time so as to find out not only a battery structure suitable for using the method of filling an electrolyte solution according to the present invention, but also a battery structure capable of improving the battery performance and productivity even in the case where the method for filling an electrolyte solution according to the present invention is not used.

One of the problems to be solved is the reduction in current collection resistance from the internal electrode body and the reduction in difference in current collection resistance of each tab. A tab is connected directly with an external terminal of the battery, that is, directly with an electrode terminal to extract current out from the battery, or is connected with an internal terminal thereof, that is, a terminal to which the tabs are intermediately connected collectively inside the battery. Accordingly, in the case where the tabs are connected with the internal terminal, it is necessary that the internal terminal is made conductive to the external terminal to form a current path between the tabs and the external terminal.

As a method for forming the conductive state between the tabs and the external terminal, there is proposed, for example, in JP-A-9-92338, a lithium secondary battery 27 in which a series of flexible leads (equivalent to "tabs" in meaning) 37 is sandwiched between the electrode terminal 38 and the hold-down hardware 33, forming a warping shape as shown in FIG. 16; said leads 37 being welded to the electrode terminal 38 by laser beam. In this lithium secondary battery 27, the electrode terminal 38 is attached to a cap (ceiling plate) 29 by using a nut 34, and the cap 29 is provided with not only electrolyte solution injection opening 32 which is to be sealed with a blank cap 30 but also a pressure release valve 26.

However, in case of the lithium secondary battery 27 disclosed in the JP-A-9-92338, the leads 37 may be sandwiched with the hold-down hardware 33 at any position of the outer periphery of the electrode terminal 38; as a corollary, the leads 37 disposed in the inner periphery of the internal electrode body 35 become long, and, on the contrary, the leads 37 disposed in the outer periphery become short. In his case, since the quantity of current flow in each lead 37 is different due to the difference in resistance of each lead 37, depending upon its length, there is a fear that the uniformity in the battery reaction cannot be maintained when used as a battery for an EV which requires the frequent flow of a large current.

In addition, since the leads 37 may be attached to any position of the outer periphery of the electrode terminals 38 with laser welding, and the structure at the end portion of the battery is complicated and various parts are installed therein, as shown in FIG. 16, thus the work efficiency (productivity) of the battery assembly is considered to be not necessarily good.

Moreover, a battery 27 disclosed in JP-A-9-92338 has the configuration at both ends, as shown in FIG. 16. It is stated in the laid-open invention that the injection of electrolyte solution is carried out by injecting electrolyte solution from one end of the injection opening 32 for electrolyte solution, while keeping the interior of the battery 27 under a reduced pressure by deaerating from the other end of the injection opening 32 for electrolyte solution, and this step should be repeated several times. However, it is not advantageous to assemble a battery with the repetition of such steps several times. Moreover, it is not advantageous to provide both ends with the injection openings 32 for electrolyte solution which eventually will be sealed since the leakage of the electrolyte solution and the decrease in air tightness are liable to occur.

Furthermore, the battery disclosed in JP-A-9-92338 has been proposed to prevent damage to leads 37 under severe vibrations when the battery is used as for the battery for an EV. Therefore, it proposes to use a flexible material for lead 37. At the same time, it refers to the reduction in internal resistance by virtue of a broadened welded portion between the leads 37 and the electrode terminals 38 formed by laser welding, however, it is quite silent about the reduction in fluctuation in the resistance among respective leads 37.

Another problem is how to secure the durability against vibration during driving since the durability is an essential requirement in the case of a battery for an EV. For example, when the internal electrode body vibrates or moves inside the battery case, there is a fear that the electrode active materials coated on the positive electrode and the negative electrode are peeled, thereby the battery capacity is reduced. Furthermore, it is not preferable since there is a fear of formation of a short circuit between the positive electrode and the negative electrode due to the peeled electrode active materials. Moreover, the end surface of the internal electrode body is apt to be deformed from an initial plain shape into a shape such as spiral waves or the like due to vibration, and such a deformation of the internal electrode becomes a cause of an unfavorable uneven battery reaction.

Therefore, there is proposed, in JP-A-9-92241, a battery 28 having such a structure that, as shown in FIG. 15, an electrode pole 25 having its lower surface covered with insulator collar 39 is inserted into a hollow portion of a cylindrical core 31 around which an electrode spiral body 36 (equivalent to the internal electrode body 1) is formed, and said electrode pole 25 is fixed to a cap 29 with a nut 34. In addition, there is proposed, in JP-A-1-751-76, a battery structure in which an internal electrode body formed by inserting a bar-shaped insulating body into a portion formed by using a tentative core which was removed thereafter is housed in the battery case.

However, in the case of the electrode spiral body 36 proposed in JP-A-9-92241, the inner peripheral surface of the battery case 19 and the electrode pole 25 function only as a stopper so as to suppress the movement of the electrode spiral body 36 in the diameter direction. However, it does not suppress the movement in the diameter direction, and it has such a structure that the movement in the longitudinal direction of the electrode spiral body 36 takes places easily in the distance of the gap with the electrode pole 25. If the movement to the longitudinal direction of the electrode spiral body 36 takes place, the electrode spiral body 36 collides with the electrode pole 25, which would damage the leads 37 (equivalent to tabs 5) attached on the end surfaces of the electrode spiral body 36. Moreover, it is considered that it is liable to receive such damage that the electrode active material is peeled, etc. at the end portions of the electrode spiral body 36.

Furthermore, in case of the invention disclosed in JP-A-1-175176, it is not formed in such a structure that the movement in the longitudinal direction of the internal electrode body is suppressed. This is because the internal electrode body is fixed by pressure formed between a solid bar of an insulator inserted into the inner peripheral surface of the battery case, and the core of the internal electrode body. Thus, no positive attempt has been made hitherto so as to suppress the movement in the longitudinal direction since much attention has been given to the fixation of the internal electrode body in the diametrical direction.

SUMMARY OF THE INVENTION

The present invention has been made so as to solve problems of the prior art mentioned above. Thus, the present invention is aiming to minimize the amount of the excessive electrolyte solution to be filled inside the battery on the occasion of forming a comparatively large capacity battery. Moreover, the present invention is aiming to provide a simple method for filling an electrolyte solution, and provide a battery structure capable of operating said filling method easily. Furthermore, the present invention is aiming to attain improvement in the battery performance such as reduction in current collection resistance and improvement of anti-vibration performance.

That is, one of the aspects of the present invention is directed to a method for filling an electrolyte solution into a lithium secondary battery comprising an internal electrode body formed by winding a positive electrode, and a negative electrode, with a separator sandwiched therebetween around the outer periphery of a core, and an electrolyte solution to impregnate said internal electrode, which comprises the steps of:

inserting a tip of a nozzle for injecting said electrolyte solution in such a depth that at least it reaches a position on an end surface of said internal electrode body located on an opposite side through a through hole of said core and an electrolyte solution injection opening being provided in an extended position of said through hole on one end surface of the battery, or an electrolyte solution injection opening being integrally formed with an external terminal in an extended position of the through hole of the core on one end surface of the battery, injecting the electrolyte solution until at least the internal electrode body is immersed, and thereafter extracting an excessive electrolyte solution remaining inside the battery by using a nozzle for extraction of electrolyte solution.

The method for filling an electrolyte solution of the present invention is preferably used in a battery where the electrolyte solution injection opening is disposed in the center of one end surface of the battery and/or the core is disposed in the center of the battery. In addition, one nozzle may be used as a nozzle for injection of electrolyte solution and a nozzle for extraction of electrolyte solution as well. It is preferable to insert the tip of the nozzle for injection of electrolyte solution or that of the nozzle for extraction of electrolyte solution in such a manner that it reaches the other end of the battery to implement injection or extraction of electrolyte solution under this state. In this case, if a recessed portion is provided in the inner center of the other end of the battery, or if a recessed portion is provided by forming the center portion of the other end of the battery in a convex shape outward, an excessive electrolyte solution remaining in this recessed portion is easily extracted by a nozzle for extraction of electrolyte solution.

After extraction of the excessive electrolyte solution, the electrolyte solution injection opening is enclosed from outside with screwing or pressure fitting or filling with a sealing material to implement sealing of the battery easily. Moreover, the assembly work of the battery becomes preferably good, if the electrolyte solution is extracted and/or injected by using a pipe as a body member of the battery case after the battery is sealed by subjecting both ends of the pipe to caulking processing in order to occlude the ends of the pipe with the cap. The method for filling an electrolyte solution of the present invention is suitably applied to a battery having a capacity of 2 Ah or more.

Now, as a first embodiment of a battery structure according to the present invention, there is provided a battery structure of a lithium secondary battery comprising an internal electrode body formed by winding appositive electrode, and a negative electrode, with a separator sandwiched therebetween around the outer periphery of a core, and an electrolyte solution to impregnate said internal electrode body;

wherein an electrolyte solution injection opening is provided in an extended position of the through hole of the core on one end surface of the battery, or an electrolyte solution injection opening is integrally formed with an external terminal in an extended position of the through hole of the core on one end surface of the battery.

In this first battery structure, the electrolyte solution injection opening is preferably disposed in the center of one end surface of the battery and/or the core is preferably disposed in the center of the battery. In addition, it is preferable that the electrolyte solution injection opening preferably may be sealed from outside with screwing or pressure fitting or filling with a sealing material.

In addition, as a second battery structure according to the present invention, there is provided a battery structure of a lithium secondary battery comprising an internal electrode body formed by winding a positive electrode, and a negative electrode, with a separator sandwiched therebetween around the outer periphery of a core, and an electrolyte solution to impregnate said internal electrode body, wherein the core is sandwiched between caps for sealing the end surfaces of the battery case, and is fixed.

And in this second battery structure, insulating materials or metal materials the surfaces of which are covered with insulating materials are preferably used as a core.

Moreover, as a third battery structure according to the present invention, there is provided a battery structure of a lithium secondary battery comprising an internal electrode body formed by winding a positive electrode, and a negative electrode, with a separator sandwiched therebetween around the outer periphery of a core, and an electrolyte solution to impregnate said internal electrode body, wherein insulating members are disposed at both ends of the core to extend the length of the core, and the core as well as the insulating member are sandwiched between caps to seal the end surfaces of the battery case, and are fixed.

In these second and third battery structures where the core, and the like are sandwiched between caps, it is preferred to provide an electrolyte solution injection opening on one of the caps at the position extended from the hollow portion of the core or the insulating member. At this time, it is preferred that hole portions or slits are provided on the end portions of the core or the insulating members. It is also preferred to provide a recessed portion in the inner center portion of the end surface of a case for battery where the electrolyte solution injection opening is not formed. It is also preferred to provide a recessed portion by forming a convex shape outwardly on the center portion of the end surface. Incidentally, such an arrangement to provide a recessed portion is suitably applied to the first battery structure, too.

Next, as a fourth battery structure according to the present invention, there is also provided a battery structure of a lithium secondary battery comprising an internal electrode body formed by winding a positive electrode, and a negative electrode, with a separator sandwiched therebetween around the outer periphery of a core, and an electrolyte solution to impregnate said internal electrode body, wherein one collective connection portion is provided in one internal terminal to connect a plurality of tabs together in one place, and the collective connection portion is positioned within an extended range in the axial direction of the core covering from the outer periphery of the core to the outer periphery of the internal electrode body.

In the case of the fourth battery structure, it is preferred to provide one collective connection portion capable of connecting a plurality of tabs together in one place in one internal terminal; said collective connection portion being positioned within a range which is extended, in the axial direction of the core, from the outer periphery of the core to the outer periphery of the internal electrode body. Moreover, it is also preferred to form this collective connection portion in such a structure that a plurality of tabs provided so as to be positioned on an approximately straight line within a range, in the direction of diameter, which is extended from the outer periphery of the core to the outer periphery of the internal electrode body are collectively connected with one internal terminal. The internal terminal is suitably disposed in the caps sealing the end portions of the battery.

Moreover, a plurality of internal terminals is preferably disposed for the positive electrode and the negative electrode, respectively. And the collective connection portions of the internal terminals are preferably placed in the extended position in the center direction of diameter from the outer periphery of the core to reach the outer periphery of the internal electrode body. The collective connection of tabs with the internal terminal is preferably formed by means of welding, or caulking, or an eyelet. The material for the internal terminal is preferably produced from aluminum, aluminum alloy, copper or copper alloy. Incidentally, if the caps sealing the end portions of the battery can act as a path for electric current, the battery structure will not become complicated and is preferable.

It is preferable to use commonly a battery case of which caps are employed as the end surfaces of the battery, in any of the above-mentioned first to fourth battery structures; said battery cases being preferably configured in such a manner that the caps are sandwiched between the end portions of the pipe, and the end portions of the pipe are sealed by caulking process. In addition, between an end portion of the internal electrode body and a cap, it is preferable to provide a necked portion in the inner periphery portion of the pipe so as to suppress the movement of the internal electrode body inside the battery. The battery structure of the present invention is suitably applied to a battery with battery capacity of 2 Ah and more, but there are no reasons to exclude application to a battery using a wound-type internal electrode body with a lower battery capacity. In addition, the battery structure of the present invention can be suitably applied to a battery to be used as a motor driving power source for an electric vehicle or a hybrid electric vehicle.

DETAILED DESCRIPTION OF PREFERRED EMBODIMENTS

Figure 1:
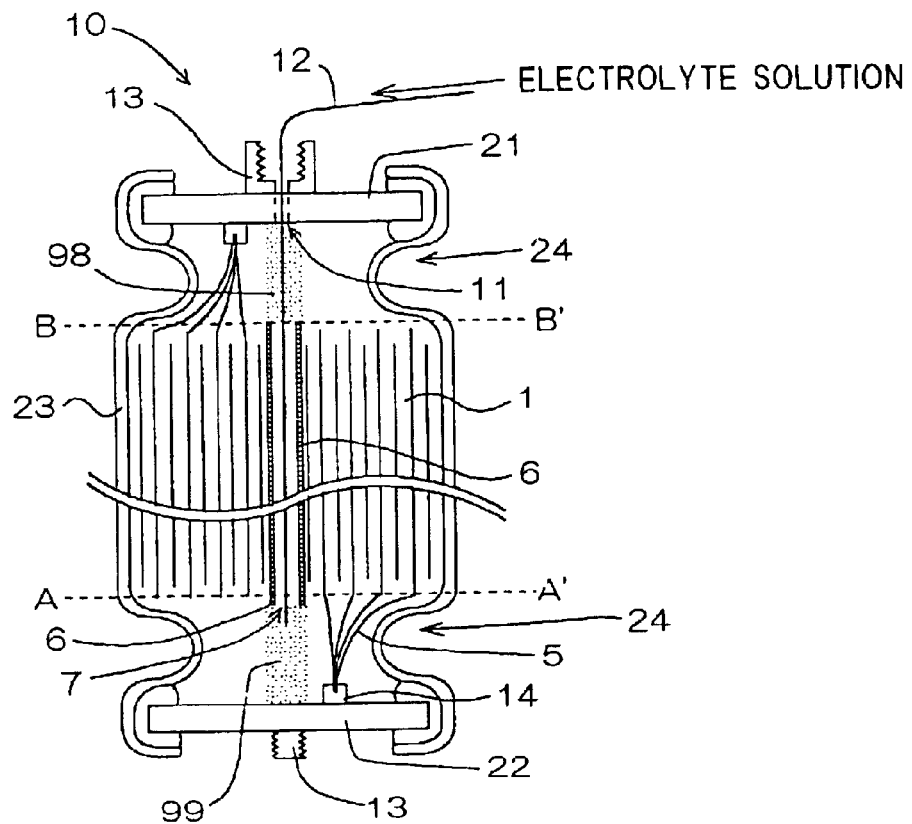
FIG. 1 is a diagram illustrating one of the embodiments of the present method for filling an electrolyte solution and that of the embodiments of the present inventive battery structures.

Preferred embodiments of the present invention will next be described with reference to the drawings, however, it goes without saying that the present invention is not limited to those embodiments.

In the case of a lithium secondary battery of the present invention (hereinafter referred to as a "battery"), as is previously explained with reference to FIG. 18, there is employed a wound-type internal electrode body 1 (hereinafter referred to as an "internal electrode body 1") which is formed by winding around the exterior circumference of a core 6 a positive electrode 2 and a negative electrode 3 to which tabs 5 are respectively attached, with a separator 4 sandwiched therebetween so as to prevent the positive electrode 2 and the negative electrode 3 from contacting directly with each other.

The positive electrode 2 and the negative electrode 3 are produced, respectively by coating electrode active material (hereinafter the term "electrode active material" is used to refer to either positive active materials or the negative active material) on both sides of the respective electrode substrates; such electrode substrates (electricity collecting body) being a foil made of aluminum, titanium, or the like for the positive electrode 2, and a foil made of copper, nickel, or the like for the negative electrode 3.

The positive active material to be used for forming the positive electrode 2 is not limited, and a lithium transition metal compound oxide such as lithium cobalt oxide ($LiCoO_2$), lithium nickel oxide ($LiNiO_2$), lithium manganese oxide spinel ($LiMn_2O_4$), or the like is suitably used, and it is preferable that carbon fine powder such as acetylene black, or the like is added so as to improve conductivity. On the other hand, as a negative active material, an amorphous carbon material such as soft carbon or hard carbon, or highly graphitized carbon powder such as artificial graphite is used.

Coating of electrode active material onto these respective electrodes is carried out generally by coating, on both sides of the electrodes, a slurry or a paste which is prepared by adding a solvent, a binder, or the like to an electrode active material powder, by way of a roll coater technique, or the like etc., and adhering the material thereon, thereby the positive electrode 2 or the negative electrode 3 is formed.

In addition, the tabs 5 can be attached to a sideline of the electrode substrate by means of ultrasonic welding, or the like at the time when the positive electrode 2 and the negative electrode 3 are wound together with the separator 4. At this time, the tabs 5 are preferably spaced at approximately even distances so as to equalize the electricity collecting area of each tab. In many cases, the material of the tabs 5 is the same as that for the electrode substrate to which the tab 5 is attached.

A cylindrical member having a through hole (or internal vacant portion) 7 is preferably used as a core 6, and one prepared from any of various materials such as metals, resins, and ceramics, can be used if it has a sufficient mechanical strength and anti-corrosion resistance against an electrolyte solution to maintain the battery structure.

In addition, as the separator 4, it is preferable to use a three-layer structural material in which a polyethylene film (PE film) having lithium ion permeability and micropores is sandwiched between porous polypropylene films (PP films) having lithium ion permeability. This serves also as a safety mechanism in which when the temperature of the internal electrode body 1 is raised, the PE film is softened at about 130° C. so that the micropores are collapsed to suppress the movement of lithium ions, that is, the battery reaction. And by sandwiching this PE film between the PP film having a higher softening temperature, the PP film maintains its shape and prevents the contact/short circuit between the positive electrode 2 and the negative electrode 3 even in the case where the PE film gets softened, and thus concrete control of the battery reaction and reservation of safety becomes possible.

As the electrolyte solution, it is suitable to use a non-aqueous organic electrolyte solution prepared by dissolving as an electrolyte at least one member selected from lithium fluoride complex compounds such as $LiPF_6$, and $LiBF_4$, and lithium halide such as $LiClO_4$, etc., into an electrolyte solution selected from the group consisting of carbonate type electrolyte solutions such as ethylene carbonate (EC), propylene carbonate (PC), diethyl carbonate (DEC), and dimethyl carbonate (DMC), and organic solvents such as γ-butyrolactone, tetrahydrofuran, acetonitrile, and the like or a mixture thereof.

The internal electrode body 1 having been prepared from the above-described materials, and the like is housed inside the battery case in such a manner that conductivity between the tab 5 and the external terminal of the battery is secured, and the internal electrode body 1 is impregnated in the non-aqueous electrolyte solution. And, thereafter, the battery case is tightly sealed. Incidentally, as will be described later, since a battery case made of a metal is suitably used, it is preferable that the outer periphery of the internal electrode body 1 be configured to be covered by the separator 4 in advance so as to attain insulation against the battery case when the internal electrode body 1 is inserted in the battery case. In addition, it is preferable that the outer periphery of the internal electrode body 1 be fixed with an insulating tape, etc., so that the internal electrode body 1 is not dissolved.

Next, an embodiment of the structure of a battery to be formed as described above as well as the diagram illustrating the method for filling an electrolyte solution of the present invention is shown in FIG. 1. Here, a pipe 23 is used as the body member of the battery case for the battery 10, and those made of metals, such as aluminum, or stainless steel are suitably used.

Incidentally, while it is not shown in FIG. 1, in the case where the metal pipe 23 is used, it is preferable to dispose an insulating film or a tube to be sandwiched between the internal surface of the pipe 23 and the outer periphery of the internal electrode body 1 so as to prevent conductivity between the internal electrode body 1 and the pipe 23 as well as the conductivity between the tab 5 and the pipe 23. Of course, as described before, when the outer periphery of the internal electrode body 1 is configured to be covered by the separator 4, the insulating film or the tube is not necessarily required to be disposed between the internal surface of the pipe 23 and the outer periphery of the internal electrode body 1.

After the internal electrode body 1 is inserted into the pipe 23, a necked portion 24 is formed at a predetermined position (around the end portion of the internal electrode body 1) of the pipe 23 to suppress easily the movement of the internal electrode body 1 in the longitudinal direction inside the battery. In addition, with the tabs 5 being connected with the internal terminals 14 respectively mounted onto the caps 21 and 22, the pipe 23 is subjected to caulking processing so that the caps 21 and 22 are used to seal both end surfaces of the pipe 23, making use of the formed necked portions 24, thereby a battery case with a tight-sealed configuration can be easily formed.

Here, the term "internal terminal" 14 means a member which tentatively and collectively connects the tabs 5 to extract electricity from the internal electrode body 1. Therefore, aluminum, aluminum alloy, copper, or copper alloy is preferably used as a material for the internal terminal 14. Incidentally, as the internal terminal 14 in the battery 10, a rivet-shaped one to which the tabs 5 are pressure-attached for connection is shown as an example, but there are no limitations on its shape.

In addition, the caps 21 and 22 are members for sealing the end portions of the battery, and the same metal material as used for the internal terminal 14 such as aluminum or copper is suitably used, but an insulating material such as a hard resin or a ceramic may also be used. Accordingly, in the case where the cap 21 is made of a metal material, the internal terminal 14 and the external terminal 13 necessarily become conductive and the current path is formed. In this case, the configuration of the end portions of the battery is made simple and improvement in terms of the battery assembly process is attained. On the other hand, in the case where an insulating member is used as the caps 21 and 22, the internal terminals 14 and the external terminals 13 may be electrically connected through outer periphery of the caps 21 and 22 or by providing conducting holes in the caps 21 and 22, etc. But, in this case, such problems that the shapes of components will get complicated and result in decrease in tightness of sealing of the battery, etc., will be inevitably presented.

It goes without saying that the external terminal 13 is a member to be disposed outside the battery 10 to extract the current of the battery outward, and there are no limitations on kinds of materials if a metal material is used. In the case where the caps 21 and 22 to be used are made of a metal, it is preferable that the internal terminal 14 and the external terminal 13 are firmly attached to the caps 21 and 22 by means of welding, etc., so as to minimize the resistance of the connecting portion of these members.

Incidentally, in the battery 10, a male screw configuration is used as the one of the external terminals 13, and a female screw configuration is used as the other thereof respectively. Adopting such a configuration is advantageous to the extent that a plurality of batteries 10 can be connected in series easily and firmly so as to minimize the contact resistance.

Incidentally, the internal electrode body 1 is normally disposed at the center (i.e., the center in the diameter direction) of the battery 10, and at this time, the core 5 of the internal electrode body 1 is necessarily disposed at the center of the battery 10. Therefore, in the battery 10, the electrolyte solution injection opening 11 is disposed in a position on the extended line of the through hole 7 of the core 6 in the cap 21 (this cap 21 is placed at the upper party) forming one end surface. In addition, the electrolyte solution injection opening 11 is integrally disposed at the center portion of the cap 21 with the external terminal 13.

With the battery 10 having the above-described configuration, the tip of the nozzle (hereinafter referred to as a "nozzle",) 12 to be used for the injection and/or the extraction of the electrolyte solution may be inserted so as to reach the other end of the battery 10 through the electrolyte solution injection opening 11 and the through hole 7. Incidentally, it is preferable to use one nozzle 12 for both of injection and extraction of the electrolyte solution, but a nozzle for electrolyte solution injection and a nozzle for electrolyte solution extraction may be used separately.

Now, the battery 10 is placed in a space where atmospheric adjustment is possible, such as a globe box, when the electrolyte solution is filled in. As described above, since both ends of the battery 10 have already been sealed with the caps 21 and 22, it is not necessary to seal the end portions of the battery 10 after the injection of the electrolyte solution is completed. Accordingly, it is not necessary to place a device, etc. to implement the sealing work inside the globe box, etc., and thus, as the globe box, etc., a small-sized one in accordance with the size of the battery 10 may be used.

When the air of the interior of the globe box, etc. is evacuated with a vacuum pump, the interior atmosphere of the battery 10 necessarily becomes a vacuum since the battery 10 is provided with the electrolyte solution injection opening 11. Here, it is preferable to make a degree of vacuum of 0.1 Torr (13.3 Pa), or less.

Under this state, the tip of the nozzle 12 is inserted through the electrolyte solution injection opening 11, and next through the through hole 7 of the core 6 to reach, at the shallowest, the opposite other end (bottom) portion, in particular, the position of the end surface of the internal electrode body 1, namely the position shown by the broken line AA' in FIG. 1, and thereafter, the electrolyte solution is injected to get at least the internal electrode body 1 dipped, i.e., to reach the level shown by the broken line BB' in FIG. 1. Here, when the tip of the nozzle 12 is inserted to reach the deepest portion (the cap 22) in the battery 10, a splash of the electrolyte solution is suppressed, and impregnation of the electrolyte solution can concretely start from the end surface at the bottom part of the internal electrode body 1.

Incidentally, while impregnation of the electrolyte solution is under way, it is preferable to maintain a level of vacuum to such an extent that the electrolyte solution may not be boiled, and at this time the level of vacuum heavily depends on the property of the solvent of the electrolyte solution to be used. In addition, the nozzle 12 may be inserted inside the battery 10 in advance before the globe box, etc., is evacuated to become a vacuum. A metal or a resin which is free of corrosion from the electrolyte solution is used as a material for the nozzle 12, and the nozzle 12 is connected with an electrolyte solution storage tank placed outside the globe box, etc. thorough a tube or a pipe, etc., and the electrolyte solution is transferred from the electrolyte solution storage tank, using a metering pump and the like. While it is not shown in FIG. 1, at the neck of the nozzle 12 or somewhere of the tube or the pipe, or the like, stop valves and the like are provided.

Thus, by filling the battery 10 with the electrolyte solution from the lower portion, the electrolyte solution will impregnate the internal electrode body 1 from the lower portion to the upper portion, and bubbles released from the internal electrode body 1 can pass through the space where the electrolyte solution has not yet impregnated, thus, efficient impregnation of the electrolyte solution can become possible. Thus, the injection time of the electrolyte solution can be shortened, in the case of which its evaporation quantity can be controlled to the minimum to avoid degradation of the electrolyte solution even in the case where the electrolyte solution contains a solvent having a high volatility.

Incidentally, according the above-described method for filling an electrolyte solution, it is difficult to observe the surface level of the electrolyte solution visually in a conventional manner due to its tight-sealed configuration with an exception of the electrolyte solution injection opening 1. Under these circumstances, the total quantity to be injected of the electrolyte solution, as explained by referring to FIG. 17 before, is determined previously to the level that it corresponds to the lowest surface level when the internal electrode body is completely dipped in the electrolyte solution in the case where the electrolyte solution is injected into a battery with its upper portion being open.

Figure 2:
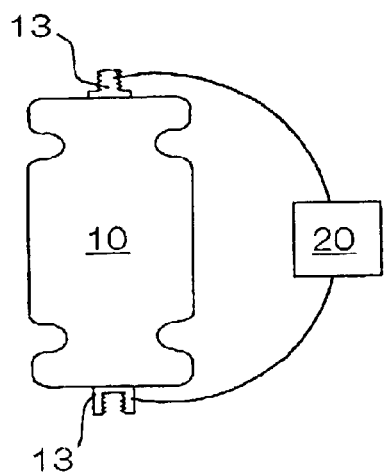
FIG. 2 is an illustrative drawing of an example of a method for measuring the period for the impregnation in the electrolyte solution.

In addition, as shown in FIG. 2, the alternate impedance between the respective positive and negative external terminals 13 provided for the battery 10 is measured using an impedance analyzer 20 and the like, thus completion of impregnation of the electrolyte solution can be judged. But, in this case, a solvent consisting of only organic solvents without containing electrolyte is used as an electrolyte solution. Using such a solvent deprives an electrolyte from affecting the alternate impedance, and the alternate impedance will directly reflect the impregnation area of the solvent.

Figure 3:
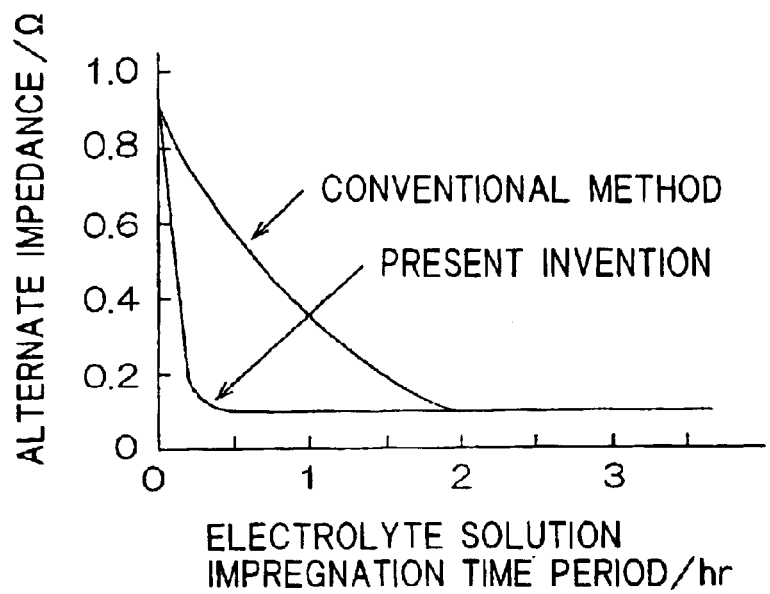
FIG. 3 is a graph showing a relationship between the period of impregnation time with electrolyte solution and the change of alternate impedance.
Figure 17:
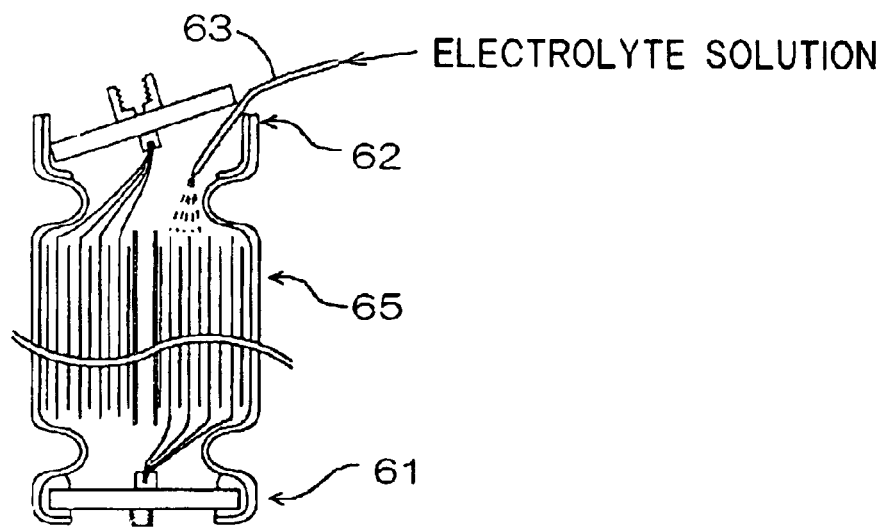
FIG. 17 is an illustrative drawing showing an example of the conventional method for filling electrolyte solution.

FIG. 3 shows an example of the results in which a relationship between the electrolyte solution impregnation time period and the change in alternate impedance has been checked, in the frequency of 100 Hz, in the respective cases of the electrolyte solution filling method from the lower portion of the internal electrode body according to the present invention and the conventional electrolyte solution filling method from the upper portion as shown in FIG. 17. Here, the electrolyte solution impregnation time period denotes a period of time to hold the vacuum atmosphere after commencement of injection of the electrolyte solution under vacuum atmosphere.

It is confirmed by FIG. 3 that, according to a conventional electrolyte solution filling method, approximately two hours of the electrolyte solution impregnation time period were required by the time when the alternate impedance dropped to a certain constant value, while, according to the present invention, the equivalent impregnation processing could be implemented in about 30 minutes and the cut in time for producing the battery can be attained. Furthermore, the property of the electrolyte solution can be secured. Incidentally, the internal electrode body used in this test was produced by winding the positive electrode substrate having the width of 200 mm and the length of 3600 mm, and the negative electrode substrate having the width of 200 mm and the length of 4000 mm, and it was housed in a battery case having an internal diameter of 48 mm φ. In addition, as a solvent, a mixture of EC and DEC in an equal quantity was used.

Next, after the impregnation process of the electrolyte solution is completed, the air in the interior of the globe box, etc., is purged with an inert gas such as nitrogen or argon, and thereafter, excessive electrolyte solution remaining inside the battery 10 is extracted outside by using the nozzle 12. At this time, for the purpose of extracting as much as possible, the excessive electrolyte solution which has filled inside the through bole 7 or the disposition spaces of the tabs 5, etc., the tip of the nozzle 12 is preferably inserted so as to reach the bottom portion inside the battery 10.

Figure 4A:
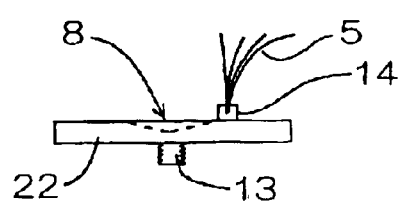
FIG. 4(a) and FIG. 4(b) are sectional views showing embodiments of a cap of the bottom of a battery usable suitably for the present invention, respectively.
Figure 4B:
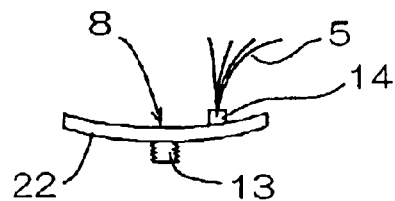

Here, as shown in the sectional view of FIG. 4(a), with a recessed portion 8 being provided at the inner center of the cap 22 forming the bottom of the battery 10, the electrolyte solution will flow into this recessed portion 8, and thus, the remaining excessive electrolyte solution will be able to be extracted to a further extent. Incidentally, as shown in the sectional view of FIG. 4(b), the recessed portion 8 may be formed by inflating the cap 22 so as to protrude outward around its center portion.

Incidentally, when the battery is miniaturized, a case in a cylindrical shape having a bottom is used as a battery case so that insertion of the internal electrode body therein and assembly of the battery will become easy. In this case, a recessed portion can be provided in the bottom portion of the cylinder-shaped case having a bottom in the first stage.

After the excessive electrolyte solution has been extracted, the electrolyte solution injection opening 11 in the globe box, etc., is sealed. If this sealing work can be done with a simple and convenient method, a small-sized globe box corresponding to the size of the battery 10 can be used as a globe box, etc. In addition to that, a device to seal the end portion of the battery 10 is not required to be disposed in the globe box, reduction in facility costs and reduction in quantity of purge gas for use can be attained.

Figure 5A:
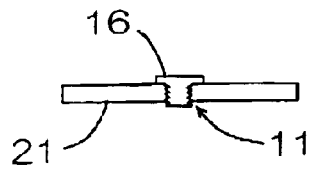
FIG. 5(a), FIG. 5(b), and FIG. 5(c) are sectional views showing embodiments of electrolyte solution injection openings usable suitably for the present invention, respectively.
Figure 5B:
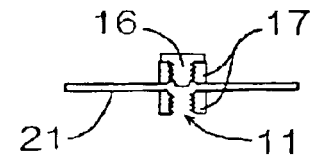
Figure 5C:
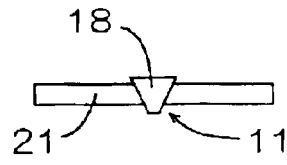

Here, the electrolyte solution injection opening 11 is preferably capable of being blocked with a simple and a convenient sealing method such as use of a setscrew from outside or pressure fitting or use of filling-in sealing material. The screwing can easily be carried out, as shown in the sectional view of FIG. 5(a), by forming the electrolyte solution injection opening 11 in the shape of a screw, and setting a screw 16 having a complementary shape thereto for fixing. If the electrolyte solution injection opening 11 should be formed in a thin cap 2, as shown in the sectional view of FIG. 5(b), a screw processing portion 17 where a screw is formed may be provided on one or both surface(s) of the cap 21 to set with a screw 16 in a complementary shape. In addition, pressure fitting may be performed by fitting a plug under pressure, into an electrolyte solution injection opening 11 having a slight inclination in such a manner that its diameter becomes gradually smaller as it goes inside the battery, a metal component 18, etc. which is fitted in with the shape of said opening, as shown in the sectional view of FIG. 5(c).

Moreover, one may seal the electrolyte solution injection opening 11 by filling sealing materials such as resin. In the case where the open area of the electrolyte solution injection opening 11 is small, the electrolyte solution injection opening 11 can also be sealed with a metal wax fused by partial heating. These various methods can of course be used to seal the electrolyte solution injection opening 11 integrally formed with the external terminal 13 shown in FIG. 1.

Now, when the electrolyte solution injection opening 11 is thus sealed, the battery is completed, but, here as for the use of the formed battery, consideration is given to a battery to drive the motor of, e.g., an EV or an HEV, etc. In this case, a voltage such as 100 V to 200 V is required to drive a motor, thus a plurality of batteries is required to be connected in series. Under these circumstances, it is preferable to install external terminals 13 of the positive electrode and the negative electrode on the caps 21 and 22 located at the both ends of the battery 10 in such a manner that these external terminals 13 are positioned at the center of the caps 21 and 22, as a battery structure of the battery 10 shown in FIG. 1, thereby the batteries 10 may be easily connected in series each other.

Figure 6:
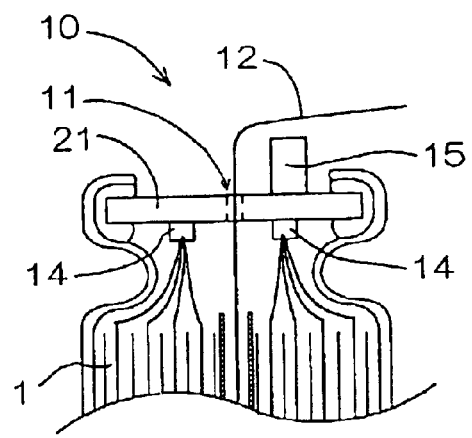
FIG. 6 is a sectional view showing another embodiment of a battery structure of the present invention.

FIG. 6 shows a sectional view of another embodiment of the battery structure according to the present invention. In this case, the electrolyte solution injection opening 11 is formed in the center of the cap 21 forming one end surface of the battery 10, and a pole-shaped external terminal 15 is disposed in the cap 21 in such a position that the electrolyte solution injection opening 11 is not obstructed thereby. Like this, there are no limitations on the position of disposition of the external terminals and their shapes, and considering the purpose and the space for mounting the battery, etc., any suitable shape may be designed.

So far the method for filling an electrolyte solution according to the present invention has been explained, but it goes without saying that the present invention is not limited to the above-described embodiments. For example, a core having a cross-section of practically circular shape is used in the above-mentioned embodiments. However, it is also possible to use a core having a section of ellipse-like shape or an ellipse shape, etc. In the battery case housing the thus obtained internal electrode body having section of practically ellipse-like shape or an ellipse shape, etc., it goes without saying that the electrolyte solution injection opening can be disposed in a position on the extended line of the through hole of the core. In other words, the present invention is not applied only to cylindrical batteries, but also to all the other batteries using cores having through holes.

Next, to be explained is a battery structure of the present invention having the battery structure to make the above-described electrolyte solution filling method easy as well as contributing to improvement of battery performance even in the case where a single battery is adopted.

If one pays attention to the interior of the aforementioned battery 10, the internal terminals 14 and the tabs 5 connected to the internal terminals 14 as well are preferably installed, as shown in FIG. 1, in a remote position from the regions located along the common line extended from the core 6 in the axial direction (in the longitudinal direction) of the core 6, namely, the region 98 which covers from the electrolyte solution injection opening 11 to the upper end of the core 6 and the region 99 which covers from the lower end of the core 6 to the cap 22 at the bottom part of the battery 10.

Since it is necessary to take in and out the nozzle 12 through the electrolyte solution injection opening 11, as described above, it is preferred that the internal terminals 14 and the tabs 5 are disposed so as not to hinder the take-in and -out of this nozzle 12. Incidentally, according to such reasons, the regions 98 and 99 may be a region within an extended line from the through hole 7 in its axial direction in a strict sense, but there are no problems in taking the regions 98 and 99 to a broad extent as described above.

In addition, the internal terminals 14 are not disposed respectively at one site in each of the caps 21 and 22 as shown in the battery 10 in FIG. 1, but may be disposed at two sites in one cap 21, and moreover, three or more may be disposed. Moreover, the following is to explain the battery structure that has been contemplated with attention having been paid to the positions to dispose such internal terminals.

Figure 7A:
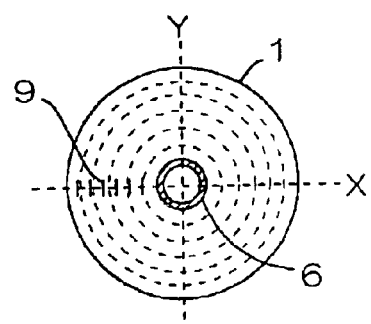
FIG. 7(a) and FIG. 7(b) are plan views showing embodiments of suitable attachment position of tabs of the present invention, respectively.
Figure 7B:
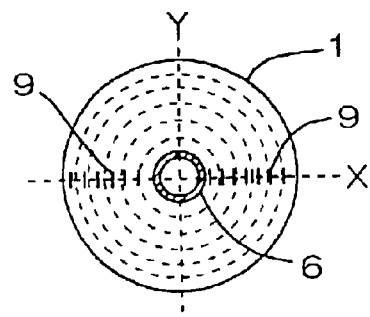

FIG. 7 is a plan view looking at the core 6 from the axial direction (the longitudinal direction) which shows an embodiment of the suitable mounting sites 9 of the tabs 5 in the internal electrode body 1. As is aforementioned, the tabs 5 are preferably spaced at approximately equal distances so that each tab 5 may collect electricity from a constant area, but as shown in FIGS. 7(a) and 7(b), the attachment sites 9 of the tabs 5 may be positioned in an approximately straight line X in the direction of diameter from the outer circumference of the core 6 to the outer circumference of the internal electrode body 1, thereby providing improvement in implementation efficiency in the case where the tabs 5 are collectively connected with the internal terminals 14. Thus, it is preferable.

In this case, as described later, in relation to the positions of the collective connection portion of the internal terminals, the tabs with minimum necessary length can reduce the resistance of the tabs themselves. Incidentally, the attachment positions 9 of the tabs 5 should be not necessarily on the straight line X. That is, the tabs 5 may be attached at any position apart from the straight line X toward the straight line Y which crosses at the right angle with the straight line X on the end surface of the internal electrode body 1, as far as they may be positioned within such a range that the collective connection of the tabs 5 is not hampered.

Figure 8A:
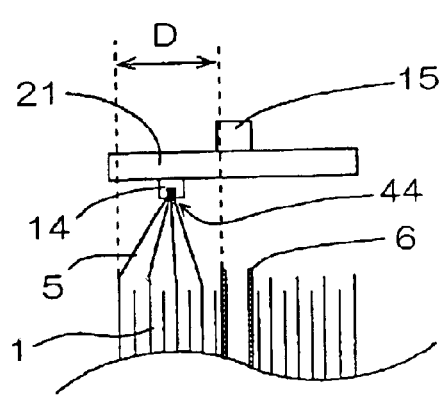
FIG. 8(a) and FIG. 8(b) are sectional views showing embodiments of a place for disposing collective connection portions in correspondence with the tab attachment position described in FIG. 7, respectively.
Figure 8B:
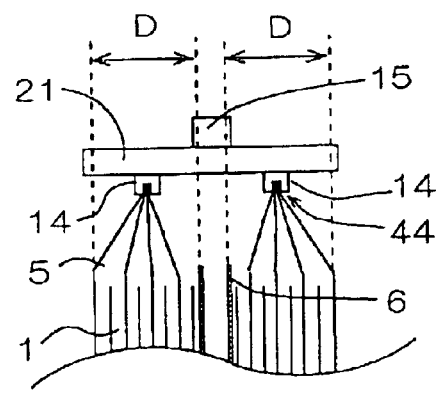

Next, FIG. 8 is a sectional view looking at one embodiment of the attachment position of the internal terminals 14 from the direction of the straight line Y crossing with the straight line X at the right angle wherein the tabs 5 are attached as shown in FIG. 7. And, FIG. 8(a) corresponds to FIG. 7(a) and FIG. 8(b) to FIG. 7(b), respectively. At least one internal terminal 14 collectively connected with the tabs 5 is disposed on one surface of the cap 21 which is a member for forming the end surface of the battery, so that its collective connection portions 44 are placed in the position which is an outward-extended range from the outer circumference of the core 6 to the outer circumference of the internal electrode body 1 in the axial direction of the core 6, i.e. within the range D. In the present invention, those with one collective connection portion 44 being disposed to connect a plurality of tabs 5 at one site together in one internal terminal 14 are suitably used. Incidentally, the outer terminal 15 is disposed on the other surface of the cap 21.

Now, it is preferred to form the tabs 5 in the same shape from the point of view of producing the battery at the time when the internal electrode body 1 is formed. In addition, this uniform shape is also preferable since the current can be expected to flow easily and evenly since the fluctuation in the resistance of the tabs 5 does not occur and the battery reaction takes place evenly. Therefore, in the case of the present invention, if the internal terminal 14 is disposed especially in the center portion even within the range D (in other words, if the collective connection portions 44 are placed within an outwardly-extended position of the central portion in the direction of diameter from the outer periphery of the core 6 to the outer periphery of the internal electrode body 1), it is preferred that the resistance is reduced, when compared with the case where the collective connection portions 44 are disposed in the center portion or outer periphery portions: for the absolute length of the tabs 5 is shortened in the above-mentioned case.

In the case where all the tabs 5 are made in the same shape so as to cope with those problems during battery assembly, the length thereof is determined in such a manner that, by taking, as a standard, the length of the tab attached to the most remote site from the collective connection portion 44, a little allowance is given to the length in an extent that the battery assembly is not obstructed due to the relatively limited length. Even in this case, if the collective connection portion is placed within the range D, as is done in the present invention, there is still an advantage that this standard length of tab may be short, compared with the case where the collective connection portion 44 is not within the range D. Thus, short and low-resistance tabs become available.

From the foregoing, in the case of the present invention, the shape of the internal terminal 14 does not matter, and connection points between the internal terminal 14 and the cap 21 can be changed variously according to the shape of the internal terminal 14. However, in case of the present invention, it is important that the collective connection portion 44 being the part to collectively connect the tabs 5 with the internal terminal 14 is disposed within the range D. Incidentally, an internal terminal 14 in a simple shape is preferably used considering the costs of internal terminals 14 themselves and their easy attachment onto the cap 21, etc.

Incidentally, according to the present invention, a plurality of internal terminals 14 is disposed so as to reduce easily the current collection resistance from the internal electrode body 1. For example, in FIG. 7(b), it is possible to design the attachment sites 9 of the tabs 5 to be disposed not only on the straight line X but also on the straight line Y, thereby the installment of four internal terminals 14 becomes possible with great ease.

The tabs 5 are collectively connected with the internal terminals 14 with welding or caulking or an eyelet so as to preferably enable suppressing the fluctuation of contact resistance in the collective connection portions 44. Since aluminum and copper are apt to form oxide films on their surfaces, there are cases where these oxide films give rise to a large difference in contact resistance between each tab 5 and the internal terminal 14 if these materials are used in these tabs 5 and internal terminals 14. Therefore, when the tabs 5 are collectively connected with the internal terminal 14 with caulking or an eyelet, the implementation preferably is done by applying pressure sufficiently high so as to destroy the oxide film, without damaging the tabs 5.

Next, the battery structure will be explained, by giving a stress onto the core.

In the case of the internal electrode body 1 used in the battery 10 shown in the above-described FIG. 1, the length of the core 6 is set approximately equal to the width of the positive electrode 2, and the like. In the structure of the present battery, the movement of the internal electrode body 1 within the inside of the battery case is suppressed by the necked portions 24 formed in the pipe 23. However, it is considered to be preferred that the improvement in the anti-vibration property is further strengthened by the fixation of the internal electrode body 1. At this time, of course, it is necessary to give consideration so that the method for filling an electrolyte solution according to the present invention can be easily carried out.

Figure 9:
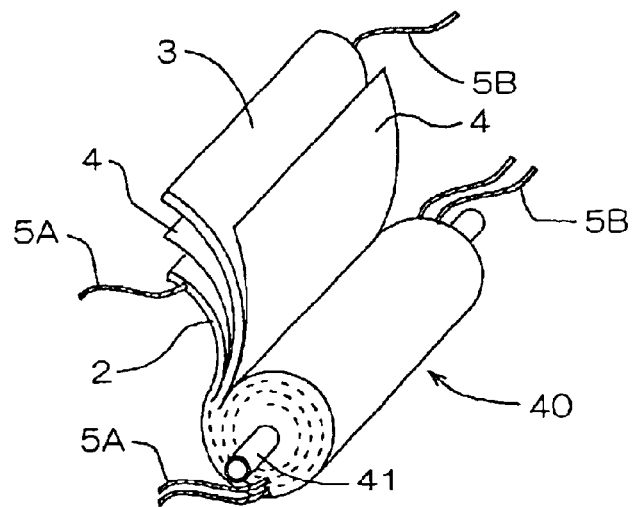
FIG. 9 is a perspective view showing the structure of a wound-type internal electrode body usable suitably for the present invention.
Figure 18:
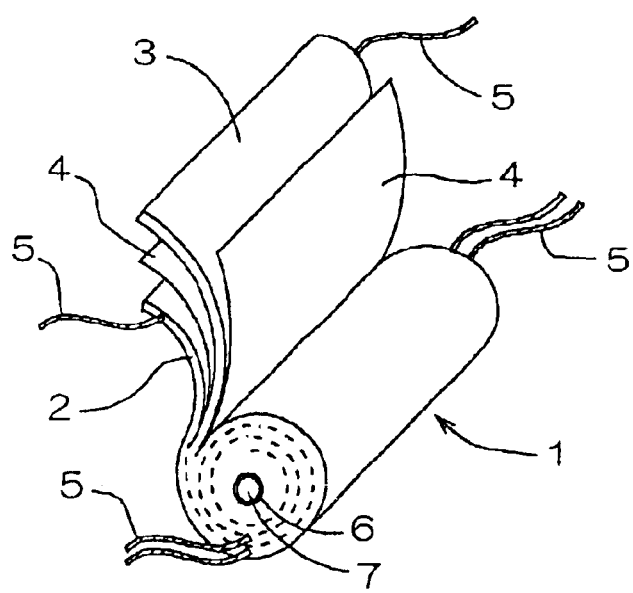
FIG. 18 is a perspective view showing a general structure of a wound-type internal electrode body.

Thus, in the case of the present invention, it is preferred to employ an internal electrode body 40 having a core 41 which protrudes long distances from the end surfaces of the positive electrode 2 and the negative electrode 3 in the axial direction, as shown in the perspective view in FIG. 9, compared with the internal electrode body 1 previously shown in FIG. 18. Incidentally, in FIG. 9, the number 4 stands for a separator, the number 5A stands for the tabs attached to the positive electrode 2 (positive tabs 5A), and the number 5B stands for the tabs attached to the negative electrode 3 (negative tabs 5B), respectively for the clarification purpose.

Figure 10:
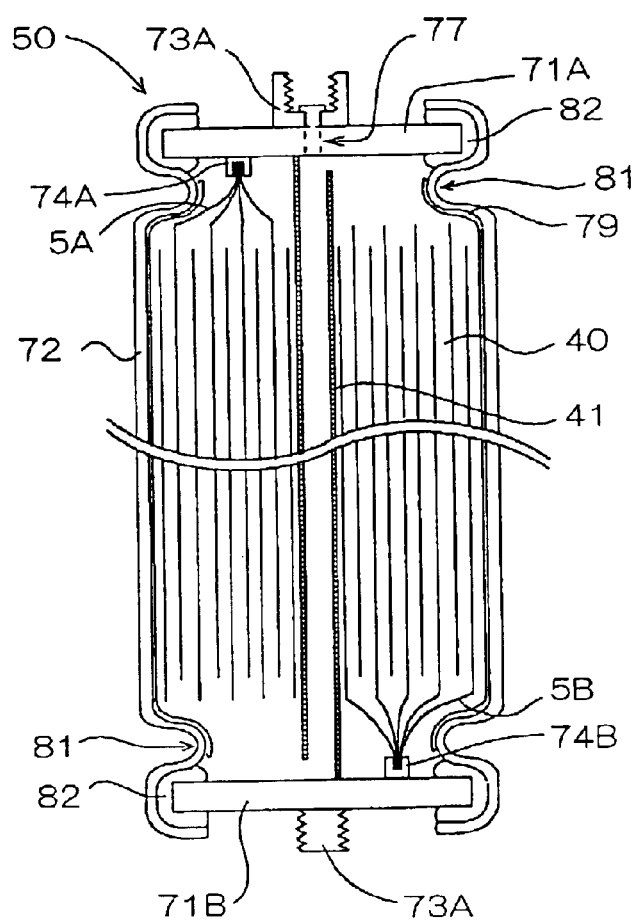
FIG. 10 is a sectional view showing still another embodiment of the battery structure of the present invention.

FIG. 10 is a sectional view showing one embodiment of the battery structure using such an internal electrode body 40. For assembling battery 50, at first, the tabs 5A for the positive electrode as well as the tabs 5B for the negative electrode being attached to both ends of the internal electrode body 40 are connected with the internal terminals 74A and 74B, respectively.

It is preferred that the internal terminals 74A and 74B are respectively attached to the caps 71A and 71B in advance, and that, at the same time, the external terminals 73A and 73B are preferably attached to another surface of the caps 71A and 71B where the internal terminals 74A and 74B are respectively disposed. Note that there will be nothing wrong with collective connection of the tabs 5A and 5B due to the employment of such a configuration as mentioned above.

Incidentally, as aforementioned, the internal terminals 74A and 74B are attached to the caps 71A and 71B so that their collective connection portions are placed within an outwardly-extended range in the axial direction of the core 41 from the outer circumference of the core 41 to the outer circumference of the internal electrode body 40. Thus, compared with the case where the tabs 5A and 5B are attached to the outer circumference portions of the caps 71A and 71B, overall length of the tabs 5A and 5B can be shortened to reduce resistance and thus can give rise to improvement in the performance of the battery.

The internal electrode body 40 to which the caps 71A and 71B, etc. are attached is inserted inside the cylindrical-shaped battery case (pipe) 72. In the inner periphery of the battery case 72, an insulating film 79 is disposed to secure insulation against the internal electrode body 40. But, in the case where the entire outer periphery of the internal electrode body 40 is covered with the separator 4, the insulating film 79 is not necessarily required in the portion of the outer periphery of the internal electrode body 40.

Here, for the purpose of suppressing movement of the internal electrode body 40 in the direction of diameter, the clearance between the outer periphery of the internal electrode body 40 and the inner surface of the battery case 72 is preferably small to an extent that it is not difficult to insert the internal electrode body 40 into the pipe 23, and further preferably, after the completion of assembling the battery, the internal electrode body 40 is preferably designed so as to receive compression stress from the battery case 72.

Then, the battery case 72 is subjected to processing for forming a necked portion, while the internal electrode body 40 is inserted in the battery case 72, to form the necked portions 81 which protrude to the inner periphery part, at the vicinity of the end surfaces of the internal electrode body 40 and between the caps 71A and 71B, taking the length of tabs 5 and the core 41 into consideration. The forming locations of the necked portions 81 not only suppress the movement of the internal electrode body 40 but also play a role to determine the fixing positions of the caps 71A and 71B.

The end portions of the battery case 72 are subjected to caulking processing by utilizing the formed neck portion 81, with inserting the sealing material 82 between the caps 71A and 711B and the battery case 72, respectively. Thus, the battery case 72 is sealed at both ends, and the core 41 is fixed in a state that it is sandwiched between the caps 71A and 711B. The core 41 may be fixed, depending only on the pressure simply given by the caps 71A and 71B, however, it is preferred that the core 41 is held by virtue of a plurality of grooves, protrusions or the like is preferably formed in the caps 71A and 71B in such a form that is complementary with the shapes of the end portions of the core 41 after assembling the core and the caps using a locating means mentioned above.

Thus, the movement of the internal electrode body 40 in the axial direction of the core 41 will be suppressed by the thus formed core 41. Moreover, as aforementioned, the movement of the internal electrode body 40 in the longitudinal direction of the core 41 is also suppressed by the necked portion 81 in a supplementary fashion, and its movement in the direction of its diameter is suppressed by the battery case 72 and the insulating film 79. Therefore, compared with conventional batteries, movement of the internal electrode body 40 within the case in the longitudinal direction and the direction of its diameter are suppressed extremely well, which results in a remarkable improvement in anti-vibration performance. As a consequence, peeling of the electrode active materials is suppressed, and the stress applied to the tabs 5A and 5B due to vibration, etc. of the internal electrode body 40 is advantageously reduced and the like, thus the long durability of the battery will be attained.

Incidentally, for the sealing material 82, a polymer material having a superior anti-corrosion property against electrolyte solutions, and good sealing performance capable of preventing leakage of electrolyte solutions by processing with caulking may be used. The polymer material may be selected from among polyethylene, polypropylene, ethylene-propylene-elastomer, styrene-type elastomer, olefin-type elastomer, ethylene-propylene rubber, butyl rubber, styrene-butadiene rubber, and fluororubber.

Now, as aforementioned, metal materials are suitably used for the caps 71A and 71B, and since the core 41 contacts the caps 71A and 71B, as the core 41, those made of insulating materials, or those coated with insulating materials on the surface of the metal materials are suitably used. Particularly, as an insulating material, a resin such as polypropylene and a phenolic resin such as bakelite (a registered trademark), or the like, and a ceramic such as alumina, or the like may be illustrated. In addition, as a metal material, aluminum, copper, stainless steel, or the like may be illustrated. As a method for coating an insulator, methods such as fixation of fluororesin, or film formation by a thermally shrinkable contraction film, and the like can be illustrated. In this respect, strictly speaking, the core 41 may be any material as far as such a material has at least the end surface made of an insulating material. As a consequence, the positive electrode 2 and the negative electrode 3 are wound around the outer periphery of the core 41 so as to be insulated against the core 41.

The aforementioned method for filling an electrolyte solution of the present invention may be applied to the battery 50 if hollow cylinder-shaped core is used as the core 41, and the electrolyte solution injection opening 77 is provided on either one of the caps 71A and 71B (the cap 71A in FIG. 10) in the outwardly-extended position of the hollow portion of the core 41 at the time of sealing both ends of the battery case 72.

Figure 11:
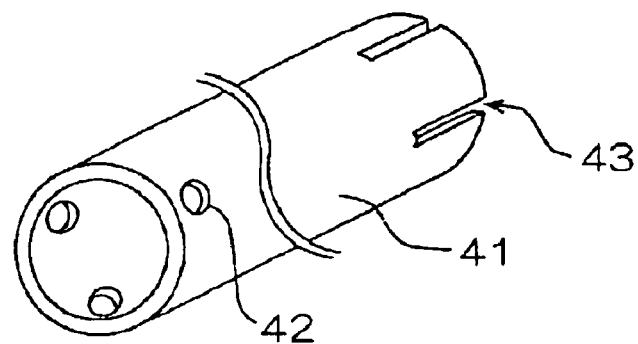
FIG. 11 is a perspective view showing an embodiment of a core usable suitably for the battery structure of the present invention.

In this case, it is necessary to arrange the electrolyte solution to flow outside of the core 41 from the hollow portion of the core 41, and to make the removal of gas at the time of injection of electrolyte solution. FIG. 11 is a perspective view showing a suitable embodiment of the core 41. Note that it is preferred to form holes 42, slits 43, or the like at the end portion of the core 41.

The battery case 72, both ends of which are sealed, is placed in a reduced atmosphere, and through the electrolyte solution injection opening 77, the tip of the nozzle for electrolyte solution injection is inserted until it reaches near the opposite end surface (the lower portion of the battery 50), and a predetermined quantity of electrolyte solution is injected and the impregnation process is carried out adequately. And after the interior atmosphere thereof is replaced by an inert gas, the nozzle for electrolyte solution injection is used as the nozzle for extraction to extract unnecessary electrolyte solution remaining in the lower portion of the battery 50 and the hollow portion of the core 41. Finally, under the inert atmosphere, the electrolyte solution injection opening 77 is sealed by using a screw or the like to complete the assembly of the battery 50.

Figure 12:
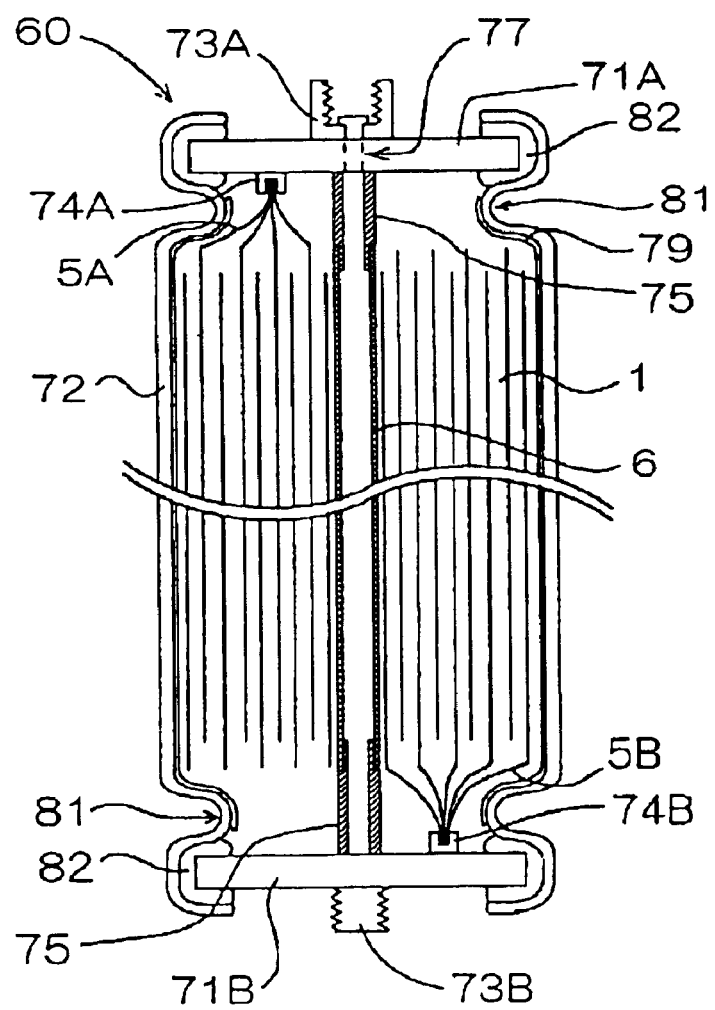
FIG. 12 is a sectional view showing still another embodiment of the battery structure of the present invention.

Next, a sectional view showing another embodiment of the battery according to the present invention is shown in FIG. 12. In case of the battery 60 shown in FIG. 12, there is used, as the internal electrode body, a conventional-type internal electrode body 1, shown in FIG. 18, which comprises the core 6 having a length almost equal to that of the positive electrode 2, or that of the negative electrode 3, and having a positively protruded portion; and insulating members 75 disposed so as to extend the length of the core 6 at the both ends, that is, the one wherein the insulating members 75 are used, and at the both ends of the core 6. And, the core 6 as well as the insulating members 75 are configured to be sandwiched between the caps 71A and 71B which are used to seal the end surface of the battery case 72 and be fixed.

Figure 13:
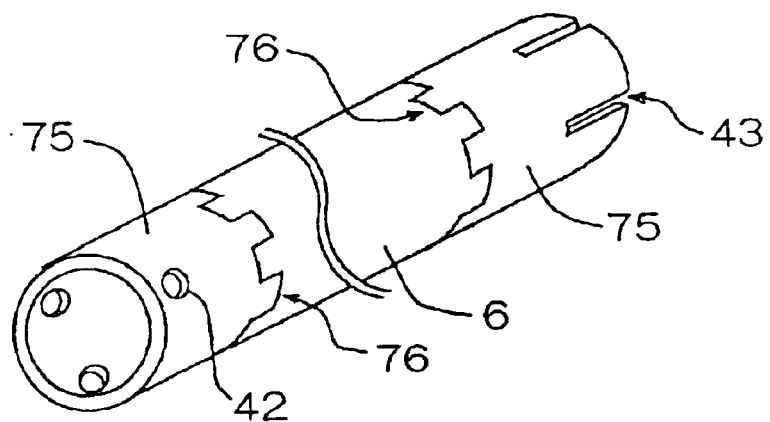
FIG. 13 is a perspective view showing another embodiment of a core usable suitably for the battery structure of the present invention.

Here, as a method to dispose insulating materials 75 at both ends of the core 6, the following method will be given as an illustrative example:

Insulating members 75 with portions having different thicknesses in the outer diameters formed by changing the thickness of the members is inserted, as shown in FIG. 12, to the hollow portions of the core 6, from the side of the portions with shorter outer diameter; or the core 6 with concave-convex portions 76 at the end portions is used, and the insulating members 75 having the end shapes to engage with these concave-convex portions 76 is inserted thereto as shown in FIG. 13. Incidentally, as the insulating member 75, an insulating resin such as polypropylene and a phenolic resin such as bakelite (a registered trademark), and the like, and ceramics such as alumina, and the like are preferably used.

Thus, the internal electrode body 1 which has the core 6 extended with the insulating members 75 makes it possible to form the battery 60 using a forming method similar to that in the case of the aforementioned battery 50. That is, the aforementioned method for filling electrolyte solution according to the present invention may be suitably used by providing the electrolyte solution injection opening 77 at the outwardly-extended position of the hollow portions of the core 6 and the insulating member 75 on one cap, for example, the cap 71A, as far as the core 6 and the insulating member 75 are hollow cylinder-shaped as shown in FIG. 13. In this case, hole portions or slits similar to the hole portions 42 or slits 43 shown in FIG. 11 are preferably provided in the insulating members 75 as shown in FIG. 13, in particular, the end parts contacting the caps 71A and 71B of the insulating members 75.

So far the battery structure of the present invention is explained. Incidentally, a battery is usually provided with a pressure release valve at the end portion of the battery as a safety mechanism for preventing accidents such as a burst of the battery caused from the rise of a battery's internal pressure due to evaporation of electrolyte solution in the case where the battery temperature rises by over-charging or over-discharging.

Figure 14A:
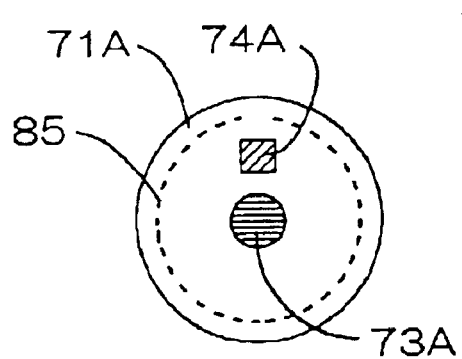
FIG. 14(a) and FIG. 14(b) are plan views showing embodiments of pressure release valves suitably disposed in the battery structure of the present invention, respectively.
Figure 14B:
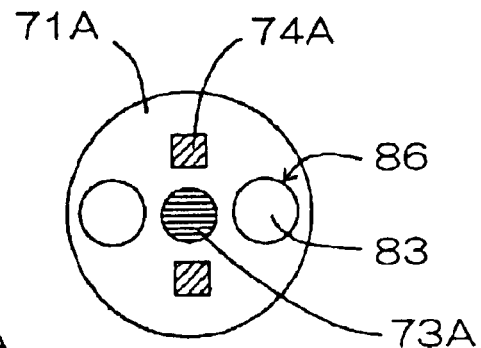
Figure 15:
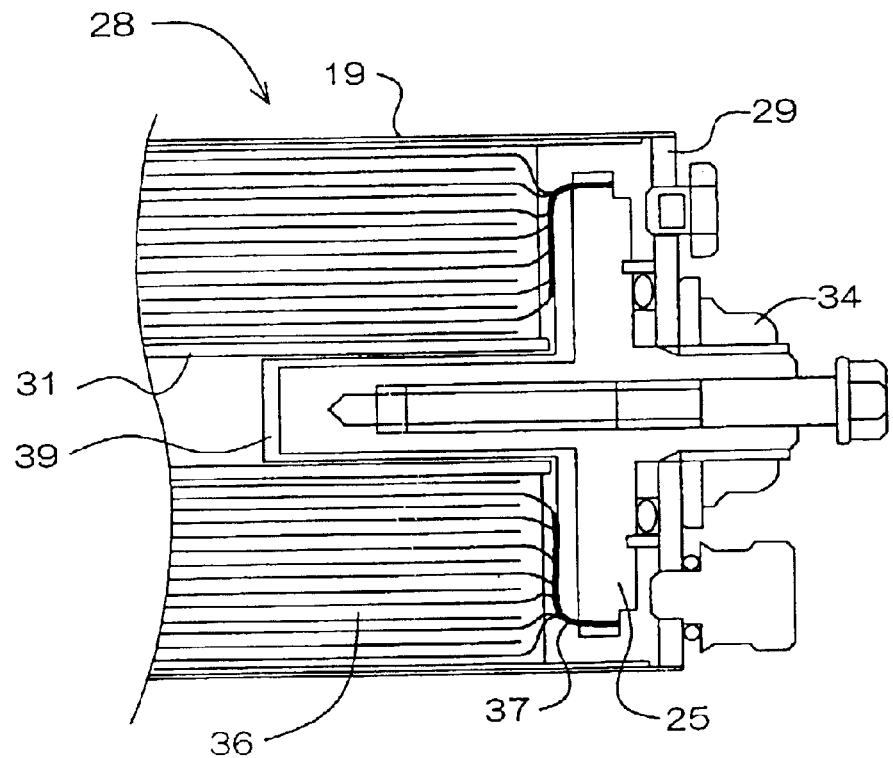
FIG. 15 is a sectional view showing an example of the end structure in the conventional lithium secondary battery.
Figure 16:
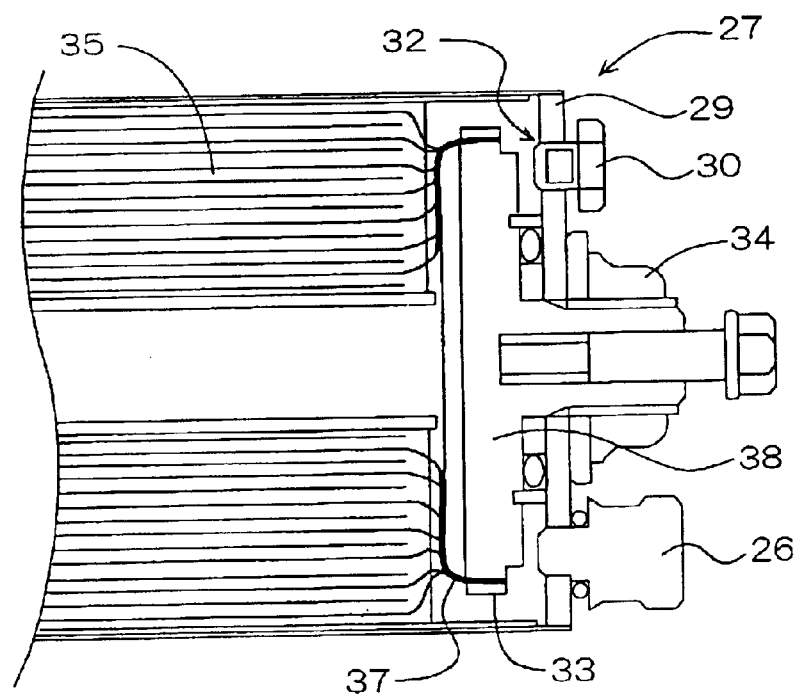
FIG. 16 is a sectional view showing another example of the end structure in the conventional lithium secondary battery.

It goes without saying that the battery structure of the present invention will not exert any bad influence upon disposition of such a pressure release valve including the above-described battery 10. For example, FIGS. 14(a) and 14(b) are plan views of the end surface of the battery 50 from the longitudinal direction of the battery 50. That is, as shown in FIG. 14(a), if a groove 85 which is thin is formed on the cap 71A, and the external terminal 73A and the internal terminal 74A are provided on a position located within the inside of the groove 85, the groove 85 will function as a pressure release valve. This is because the groove 85 can be torn to act as a pressure release means since the groove is weakened in mechanical strength when the internal pressure of the battery rises, thereby the internal pressure of the battery is released to the atmosphere.

In addition, as shown in FIG. 14(b), a metal foil 83 only bursts and the internal pressure of the battery will be released to the atmosphere when the internal pressure of the battery rises; this is because, if a hole portion 86 is provided in a portion of the cap 71A and a metal foil 83 is attached thereto with welding, bonding, or the like so as to seal this hole portion, the metal foil 83 will function as a pressure release valve.

So far, the present inventive method for filling an electrolyte solution and the present inventive battery structure as well are explained, and the present invention is suitably applied to the assembly of batteries having a comparatively large capacity of, in particular, 2 Ah or more. But, it goes without saying that the present invention can also be applied to batteries having a capacity smaller than the battery mentioned above, using wound-type internal electrode body. In addition, the battery according to the present invention can be suitably used as a motor-driving power source for an EV, an HEV, or the like. This is because it has a simple battery structure to assemble it easily, and moreover, the reduction in weight is attained due to a limited number of parts. Furthermore, it is featured with superior anti-vibration performance.

As described above, according to the method for filling an electrolyte solution of the lithium secondary battery of the present invention, the electrolyte solution can be injected simply. Thus, there can be brought remarkable effects such as the reduction in the production cost, the stability in the performance of the electrolyte solution and consequently stability of the performance of the battery. In addition, excessive electrolyte solution can be extracted and be reused, which will make production cost cut attainable. Moreover, the quantity of excessive electrolyte solution remaining inside the battery can be minimized, thus leakage of the electrolyte solution, and corrosion, due to electrolyte solution, of various components disposed inside the battery will become preventable. Since it is not necessary to seal the end surfaces of the battery case under an inert atmosphere after the completion of filling the electrolyte solution, the reduction in facility costs due to miniaturization of the globe box, and the like, and the reduction of the consumption of inert gas may be attained, thereby the process for assembly of the battery is simplified.

Moreover, since the internal electrode body is fixed firmly inside the battery according to the battery structure of the lithium secondary battery of the present invention, the movement or deformation of the internal electrode body due to vibration hardly takes place and excellent anti-vibration performance can be obtained, remarkably contributing to the improvement in the reliability and the long durability of the battery life. Furthermore, since the position for disposing the internal terminal is optimized, the resistance of the tabs itself is reduced, and the fluctuation of the resistance among tabs can be reduced to a smaller level, there are attained remarkable effects such as the homogeneity of the battery reaction, the long durability of the battery life, and the easy discharge of a large current. In addition, there is an advantage that a plurality of internal terminals is easily disposed, and the current collection resistance from the internal electrode body may easily be reduced.

Since parts for the lithium secondary battery of the present invention are limitative, and the shape of each part is not so complicated, the assembly of the battery is easy, and the reduction of the battery weight is attained. Thus, there is an advantageous effect that batteries with high energy density can be fabricated for a low cost.

What is claimed is:

1. A lithium secondary battery comprising:
    an internal electrode body comprising a positive electrode, a negative electrode, and a separator positioned between said positive electrode and said negative electrode, said electrode body being wound around the outer periphery of a core, and
    an electrolyte solution impregnating said internal electrode body;
    wherein an electrolyte solution injection opening is provided in an extended position of a through hole of the core on one end surface of a case for said battery, or an electrolyte solution injection opening is integrally formed with an external terminal in an extended position of said through hole of the core on one end surface of a case for said battery.

2. The lithium secondary battery according to claim 1, wherein said electrolyte solution injection opening is disposed in the center of one end surface of the case for said battery.

3. The lithium secondary battery according to claim 1, wherein said electrolyte solution injection opening is closed from outside with screwing, pressure fitting or filling with a sealing material.

4. A lithium secondary battery comprising:
- an internal electrode body comprising a positive electrode, a negative electrode, and a separator positioned between said positive electrode and said negative electrode, said electrode body being wound around the outer periphery of a core, and
- an electrolyte solution impregnating said internal electrode body,
- wherein the core is fixedly sandwiched between caps for sealing the end surfaces of a battery case, and wherein said core is made of an insulating material or a metal, the surfaces of which are coated with an insulating material.

5. The lithium secondary battery according to claim 4, wherein either hole portions or slits are provided on at least one end portion of the core.

6. A lithium secondary battery comprising:
- an internal electrode body comprising a positive electrode, a negative electrode, and a separator positioned between said positive electrode and said negative electrode, said electrode body being wound around the outer periphery of a core, and
- an electrolyte solution impregnating said internal electrode body, wherein the core is fixedly sandwiched between caps for sealing the end surfaces of a battery case, and wherein one of said caps is provided with an electrolyte solution injection opening in an extended position of a hollow portion in said core.

7. The lithium secondary battery according to claim 6, wherein a recessed portion is formed in an inner center portion of an end surface of a case for said battery where an electrolyte solution injection opening is not formed, or a recessed portion is provided by making said center portion of an end surface a convex shape outwardly.

8. A lithium secondary battery comprising:
- an internal electrode body comprising a positive electrode, a negative electrode, and a separator positioned between said positive electrode and said negative electrode, said electrode body being wound around the outer periphery of a core, and
- an electrolyte solution impregnating said internal electrode body,
- wherein insulating members are disposed at both ends of the core to extend the length of the core, and the core and the insulating members are fixedly sandwiched between caps to seal end surfaces of a case for said battery.

9. The lithium secondary battery according to claim 8, wherein one of said caps is provided with an electrolyte solution injection opening in an extended position of a hollow portion in said core or said insulating members.

10. The lithium secondary battery according to claim 8, wherein either hole portions or slits are provided on at least one end portion of the core or at least one of said insulating members.

11. The lithium secondary battery according to claim 10, wherein a recessed portion is formed in an inner center portion of an end surface of a case for said battery where said electrolyte solution injection opening is not formed, or a recessed portion is provided by making said center portion of an end surface a convex shape outwardly.

* * * * *